Patented Nov. 18, 1924.

1,515,947

UNITED STATES PATENT OFFICE.

JOHN A. HALL, OF VICTORIA, BRITISH COLUMBIA, CANADA.

PROCESS FOR TREATING COCOA BEANS.

No Drawing.   Application filed November 16, 1921.   Serial No. 515,736.

*To all whom it may concern:*

Be it known that I, JOHN A. HALL, citizen of the Dominion of Canada, residing at Victoria, in the Province of British Columbia, Canada, have invented certain new and useful Improvements in Processes for Treating Cocoa Beans, of which the following is a specification.

This invention relates to a process or method of treatment, having for its object the removal of the natural fat to any desired extent from the cocoa bean whereby the cocoa is rendered more digestible.

Under existing practice the fat is extracted by applying pressure to the previously roasted and ground beans, which method is to a large extent ineffective as a considerable residue of fat is retained in the bean meal.

The fat can be completely removed by the use of certain solvents in an apparatus known as the "Soxhlet" extractor. This method is used by chemists in ascertaining the fat contents of certain beans, but is not suited to commercial purposes owing to the prolonged character of the treatment and to the necessity of vaporizing considerable volumes of the solvent used.

Certain vegetable products can have their contained fat removed by the relatively simple process of percolation with a solvent, but this is not applicable commercially to the treatment of cocoa beans without a pretreatment, such as is described in the following specification, to render the contained fat more readily soluble or accessible by the solvent.

The process, which is the subject of this application, comprises two stages, first, a heat treatment of the previously roasted ground beans, and second, a treatment with a solvent to remove the fat constituent.

The preferred form of treatment is as follows: To one hundred (100) parts by weight of roasted beans, ground to pass through a sieve mesh of twenty-five strands to the inch, is added twenty (20) parts by weight of water having a half ($\frac{1}{2}$) part by weight of a mild alkali, such as a carbonate or bicarbonate of sodium or potassium, or ammonium carbonate, or ammonia or any combination of these.

This mixture of the ground beans and the alkali solution is maintained at a temperature of about ninety (90°) degrees centigrade, for about four (4) hours in a closed vessel provided with a vent that will prevent accumulation of pressure but will not permit the mixture to dry out. Thereafter the ground beans are dried in any convenient manner, preferably by heated air.

As an alternative, the ground beans are subjected to moist heat (steam) treatment in a digester, either at atmospheric pressure or at such higher pressure as may be found advantageous. Satisfactory results have been experienced with a pressure of five (5) pounds above that of the atmosphere. If at atmospheric pressure, the treatment should last about two hours, but if a higher pressure is used, ten minutes are sufficient to effect the desired change.

If a mild alkali is used, it should be mixed with the beans before putting it into the digester, but if ammonia is used it should be injected with the steam.

It must be understood that while the alkali is advantageous in the process, it is not essential, as the heat treatment alone facilitates materially the solvent removal of the fat.

The ground beans are then dried as previously described.

After a heat treatment by either of the methods described and subsequently drying, the ground beans are subjected, preferably by percolation, to the action of a suitable fat solvent, until the required percentage of fat is abstracted. By using an amount of solvent four times the weight of the beans under treatment, ninety-five (95%) per cent of the fat may be removed during a period of one and a half hours.

The heat treatment and drying as described has a marked effect on the ground beans. It not only renders the fat therein more accessible by the solvent, but imparts to the particles of the ground bean a sand-like character, through which the solvent flows freely as water will through sand, and it drains from the bean as a clear liquid, almost entirely free from the mud of fine cocoa. This is a great advantage, as the fat is readily recovered in a saleable condition.

It is undesirable to try and explain the nature of the changes effected on the particles of the ground bean by the treatment described, as such explanation would be largely unproved theory.

Any of the customary solvents for such fats may be used. Those of the alcohol class are not satisfactory. The removal of the solvent adhering to the extracted cocoa, and the recovery of the fat from the solvent need not be described, as they are well known to chemists familiar with this class of work.

I am aware that ground cocoa beans have heretofore been treated by moist heat with or without a mild alkali, with the object of improving the flavour and digestibility of the cocoa, but the marked effect that such treatment has on the abstraction of the fat by a solvent was not known, I believe, until I discovered it.

Having now particularly described my invention, I hereby declare that what I claim as new and desire to be protected in by Letters Patent, is:

1. A process for the removal of the natural fat from cocoa beans, which comprises roasting and grinding the beans, then subjecting the mass to the action of heat, and a mild alkali solution, drying the mass after such heat treatment and then dissolving and removing the fat therefrom in a suitable solvent.

2. A process for the removal of the natural fat from cocoa beans, which comprises roasting and grinding the beans, subjecting the roasted and ground beans to the action of heat and a mild alkali solution, drying the mass and then passing a suitable solvent through it.

3. A process for the removal of the natural fat from cocoa beans, which comprises roasting and grinding the beans, then moistening the mass with water in which a mild alkali has been dissolved, subjecting the moistened mass to the action of heat while retaining the moisture, drying the mass thereafter and subsequently passing a suitable fat solvent through the mass whereby the fat is removed from the beans in the solvent.

4. A process for the removal of the natural fat from cocoa beans, which comprises roasting and grinding the beans, subjecting the previously roasted and ground beans to the action of moist steam under pressure with which steam a small proportion of ammonia is delivered, drying the mass after such treatment, and then passing a suitable solvent through the dried mass.

In testimony whereof I have affixed my signature.

JOHN A. HALL.